No. 811,981. PATENTED FEB. 6, 1906.
F. B. WILDMAN & E. G. LOOMIS.
DRIVING MECHANISM.
APPLICATION FILED AUG. 3, 1904.
2 SHEETS—SHEET 2.
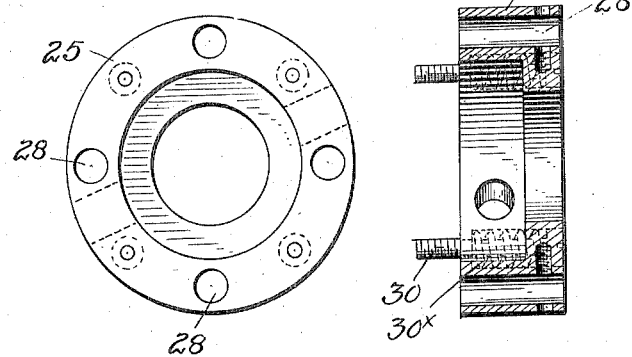
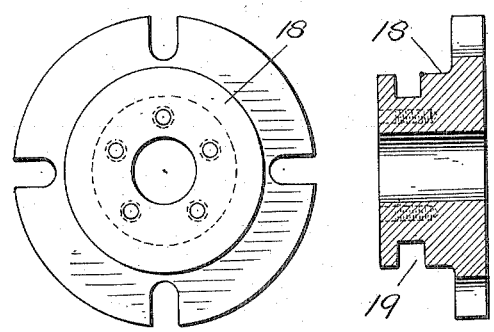
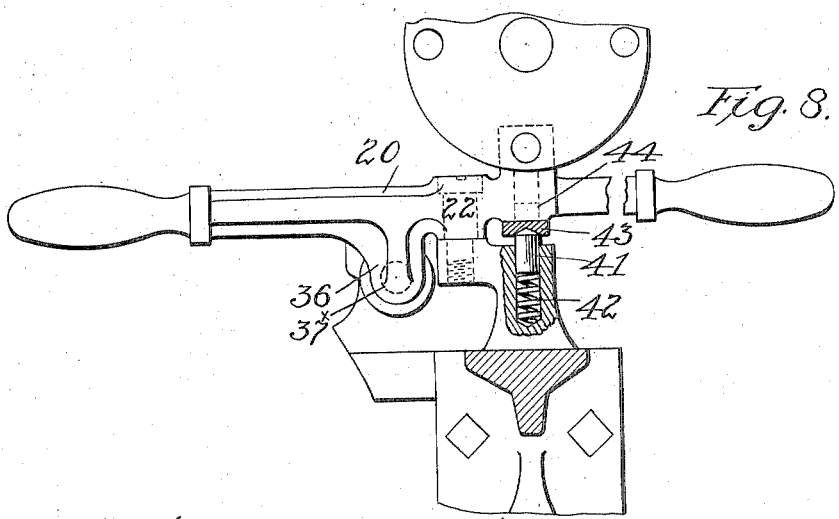
Attest
C. S. Middleton
Edward Sarton
Inventors
Frank B. Wildman
Evarts G. Loomis
by Spear, Middleton, Donaldson & Spear
Attys.

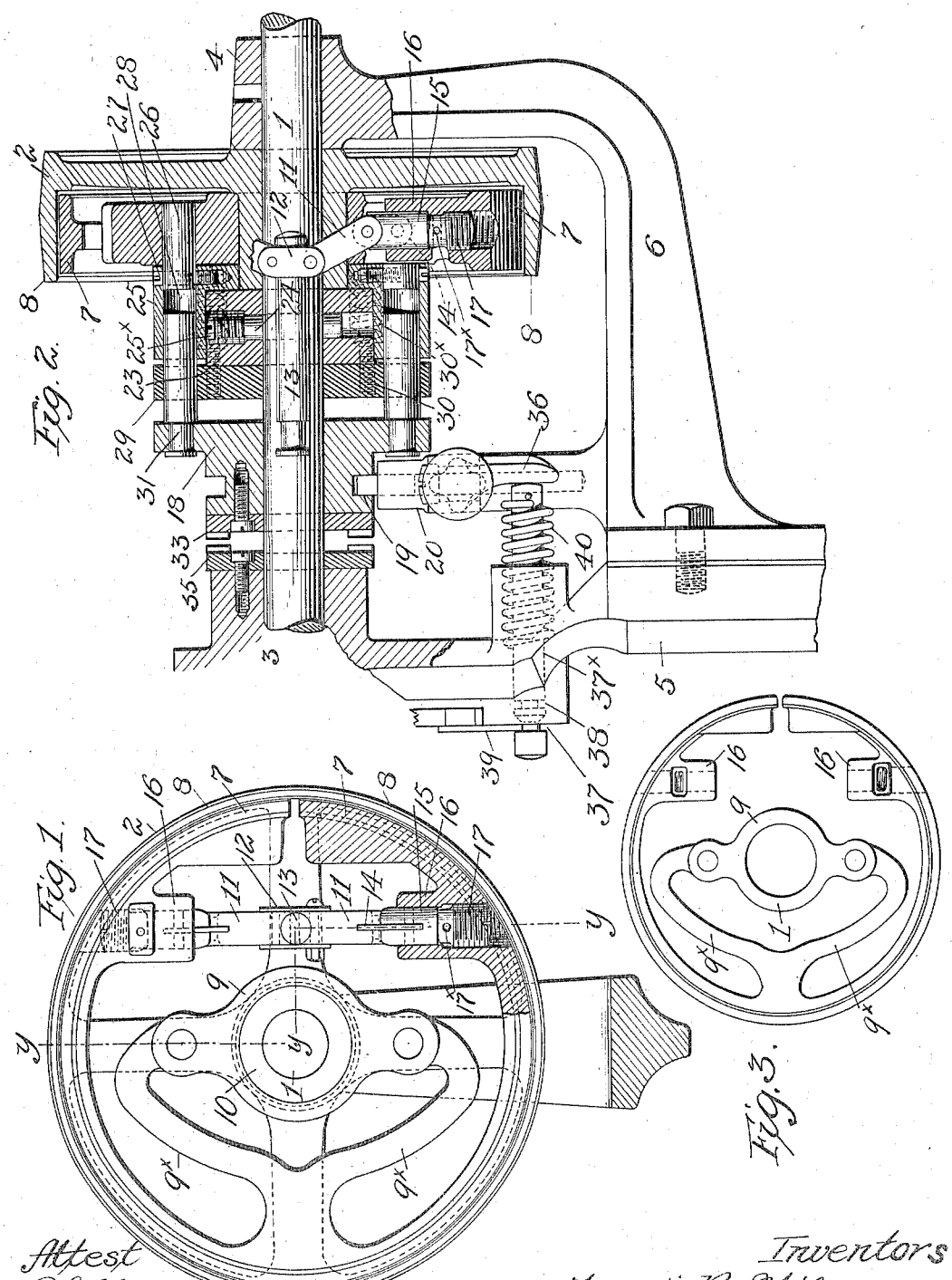

UNITED STATES PATENT OFFICE.

FRANK B. WILDMAN AND EVARTS G. LOOMIS, OF NORRISTOWN, PENNSYLVANIA, ASSIGNORS TO McMICHAEL & WILDMAN MANUFACTURING CO., OF NORRISTOWN, PENNSYLVANIA.

DRIVING MECHANISM.

No. 811,981.      Specification of Letters Patent.      Patented Feb. 6, 1906.

Application filed August 3, 1904. Serial No. 219,397.

*To all whom it may concern:*

Be it known that we, FRANK B. WILDMAN and EVARTS G. LOOMIS, citizens of the United States, residing at Norristown, Pennsylvania, have invented certain new and useful Improvements in Driving Mechanism, of which the following is a specification.

The invention consists in a friction drive for knitting-machines and the like, and it is designed to insure against breakage of the machine in case of any obstruction or extraordinary resistance being offered to the working thereof.

The invention permits the driving power to be disconnected by hand at will from the parts to be driven, or a suitable stop-motion mechanism may be employed to throw out of action the driving connection. Provision is made also for arresting the machine at once upon the driving connection being thrown out, and in doing this the friction connection is relied on, working in conjunction with a clutch which is connected with one of the friction members and is adapted to engage a fixed clutch part to arrest the said clutch member and friction member, and thus provide a rigid friction-surface for the moving friction member to work against.

Other objects and features of our invention will appear hereinafter.

The invention consists in the features and combination and arrangement of parts hereinafter described, and particularly pointed out in the claims.

In the drawings, Figure 1 is a front view of the invention, partly in section. Fig. 2 is a sectional view taken longitudinally along the shaft with parts in elevation and with a portion to the front of the shaft in section along the line *y y* of Fig. 1. Fig. 3 is a detail view, reduced, relating to the split ring for communicating the power from the drive-pulley to the parts to be turned. Figs. 4 and 5 are detail sectional and front views of the casing, associated with the friction collar or plate. Figs. 6 and 7 are details relating to the shifting-sleeve. Fig. 8 is a detail view of the hand-lever for operating the parts, showing its relation to the other parts.

In the drawings, 1 is the shaft to be driven, and 2 the drive-pulley loose thereon. The shaft is journaled in bearings 3 4 on the standard 5 and the bracket 6, forming parts of the machine-frame. Within the drive-pulley there is a split clutch-ring 7, arranged to bear on the inner side of the overhanging flange 8 of the pulley. This split ring has a central hub or collar 9, surrounding the hub 10 of the drive-pulley, and curved arms $9^\times$, having a certain degree of flexibility to connect this central hub with the peripheral or rim portion of the split ring at a point substantially diametrically opposite the split in the ring. For operating the split ring toggle-links 11 are pivoted to parts 12, fixed on a rod 13, said links being connected with other links 14, which in turn connect with the pins 15, moving in bosses 16, formed with or attached to the split ring on opposite sides of the point at which said ring is split or separated. These pins bear on screw-threaded pieces 17, adjustably held in the said bosses and arranged to take the thrust of the pins 15. These pieces 17 are provided with openings $17^\times$, adapted to receive a key or wrench-pin by which the screw-threaded piece can be adjusted to set the parts of the split ring in proper relation to the pulley. The resilient arms $9^\times$ are provided in order to secure an even contact of the said split ring throughout the inner side of the pulley-flange, for upon spreading the split ring the arms will be slightly flexed, so that contact of the ring with the pulley will take place throughout the extent of the outer side of the split ring.

For operating the toggle-links I employ the rod 13, which is connected with a collar 18, arranged to both turn and slide on the shaft 1. This collar has a slot receiving the reduced end of the rod 13, and said rod is headed and shouldered, so that it will move in either direction with the collar when the latter is operated. The collar is grooved circumferentially, as at 19, and receives a pin or fork of an operating-lever 20, said lever being pivoted at 22. When the hand-lever is operated, the collar will be slid along the shaft and will, together with rod 13, move the toggle-links to spread the split ring or allow the same to assume its normal position, as the case may be. In the former case the pulley would drive the split ring and collar around with it, while in the latter case the pulley would run free without driving the split ring.

The friction driving members comprise a disk or block 23, fixed rigidly on the shaft by a pin 24, passing diametrically through the shaft and disk and being held in place by its threaded head 25× engaging a threaded recess in the disk. Partly surrounding this disk is a friction-casing 25, which is secured to the split clutch-ring by pins 26, fixed in said ring and projecting into openings 28 in the casing by screws 27, extending through the casing and through the pins 26. Against the inner face of the shaft friction disk or block 23 a friction-plate 29 bears, said plate being connected to the casing 25 so as to form a part thereof by screws 30 passing through recesses formed in the main part of the casing, said recesses containing springs 30×, bearing on the heads of the screws so as to draw the parts of the friction-casing, or more properly speaking, the friction-plate into yielding contact with the face of the friction block or disk. This frictional pressure may be adjusted by turning the screw-pins 30, and thus the parts may be set to transmit more or less of the power of the driving-pulley to the shaft to be driven.

The shifting sleeve or collar 18 has pins 31 projecting therefrom into openings in the friction-plate and into the openings 28 in the friction-casing, and these, in conjunction with the pin or rod 13, serve to connect the collar, the friction plate and casing and the split ring being connected with the friction-casing all of these parts—i. e., the split ring the casing, the friction-plate, and the collar or sleeve—rotate as one body when driven by the pulley, and rotation is imparted to the shaft by frictional contact of the friction-plate and friction-casing with the friction-disk fixed on the shaft, and, as before stated, the friction contact or pressure may be determined by adjusting the screws, as before stated, to compress or relax the springs 30×.

In order to disconnect the driving-pulley from the shaft, the collar or sleeve 18 is shifted to the left. This causes the rod 13 to be drawn upon, operating the toggle-arms and relieving the split ring of pressure. This shifting of the sleeve or collar causes a clutch-jaw 33, carried thereby, to engage with its teeth the clutch-teeth 35 on a jaw fixed to a stationary part of the machine, as the bearing 3 of the frame 5. The clutch-jaws are secured to the parts carrying them. When the collar is shifted all the way to the left, the clutch members engage and at once the rotary movement of the collar, together with the friction members 29 and 25 and the split ring, is arrested and the friction-casing and friction-plate now act as stationary friction-surfaces against which the faces of the friction block or disk act to stop the rotation of itself and of the shaft. It will thus be seen that the friction-surfaces are effective both in driving and stopping the machine, in the latter case acting as a brake.

For operating the sleeve or collar 18 longitudinally of the shaft to set or release the split ring we employ the lever 20, before mentioned. This has a handle to be operated by hand, and it is arranged to be operated automatically, for which purpose it is provided with a projection 36, extending down therefrom, which is borne upon by a rod 37×, slidably mounted in the frame and provided with notches or grooves 37 38 to be engaged by a trip member 39, forming a part of any suitable stop-motion connections controlled by detector devices of any appropriate character. The rod 37× is pressed by a spring 40, and when released by the detent or trip member 39 it will, under the power of the spring, move the lever 20 so as to move the collar or sleeve along the shaft, and thus allow the split ring to contract and withdraw itself from contact with the pulley, thus disconnecting the machine from the driving power. This same action will throw the clutch members into engagement, and the friction members will now act as braking means, the disk on the shaft running against the friction-surfaces of the friction-plate.

It is desirable at times to hold the parts of the driving mechanism in an intermediate position so that the split ring will not be in engagement with the pulley, nor will the clutch members be in engagement, leaving the machine free to be turned by hand. In order to set the parts in this midway position, we provide a centering-pin 41, arranged in a socket in the frame and pressed by a spring 42. The pin has a conical end which enters a corresponding recess in the head 43 of a pin 44, held in a socket of the hand-lever. By moving the hand-lever to a central or intermediate position the centering-pin will engage the lever, and thus hold it with sufficient force to maintain the parts in intermediate position. Ordinary force, however, when applied to the hand-lever to move it will be sufficient to overcome the holding action of the centering-pin and permit the setting of the parts for the operation of the machine.

The notch or groove 38 is provided in the sliding spring rod or pin in order that the said pin may be held back, so as not to act upon the hand-lever, thus allowing said hand-lever to be freely operated in both directions at will. Notch or groove 38 in sliding spring rod or pin is used to allow of the shifting parts to be shifted by the hand-lever either to an intermediate position or the extreme left position, thus holding the clutch out of engagement and allowing the machine to be turned by hand. Without the notch or groove 38 it would be impossible to hold the clutch out of engagement without first applying the power to the shaft and starting the machine, which would be detrimental if an accident should happen, causing some parts of the machine to become disarranged. On an occasion of this kind the machine must be moved by hand until proper adjustments are made.

We claim—

1. In combination, with the shaft, a pulley, a friction member fixed on the shaft, a second friction member in engagement therewith, a split-ring connection between the said second friction member and the pulley, with means for controlling the said split-ring connection, and a clutch between the said second friction member and a fixed part of the frame, substantially as described.

2. In combination with the shaft and the pulley loose thereon, a friction member secured to the shaft, a second friction member with connection between the said second friction member and the loose pulley adapted to be adjusted to connect with or disconnect the said second friction member from the loose pulley, a collar arranged to slide on the shaft, a clutch member associated with the said collar, and a clutch member fixed to a frame part, means extending from the said collar to the adjustable connection between the second friction member and the pulley, the said collar, when moved one way, setting the said adjustable connection to drive the second friction member and also to release the clutch, and when moved in the opposite direction throwing the clutch into operation and simultaneously releasing the adjustable connection of the second friction member, substantially as described.

3. In combination with the shaft and the pulley loose thereon, a collar arranged to slide longitudinally on the shaft, friction connections between the shaft and the pulley, clutch means between the shifting collar and a part of the frame and means for operating the collar, the said collar when moved in one direction controlling the friction devices to drive the shaft from the pulley and when moved in the opposite direction engaging the clutch members, the said friction devices then acting as braking means, substantially as described.

4. In combination, the pulley and its shaft, means for connecting the pulley with and disconnecting the same from the shaft, a slidable collar controlling the said connection, and a clutch also controlled by the said slidable collar, said clutch being adapted to arrest the movement of the parts when the driving connection is released, and means for operating the collar, substantially as described.

5. In combination with the shaft, a pulley loose thereon, friction devices between the shaft and the pulley, the connection between the said friction devices and the pulley, a collar slidable on the shaft with means for controlling the said connection, a clutch controlled by the collar and rendered effective when the collar is thrown back to release the driving connection whereby the friction devices will then act as a brake, the lever for operating the sliding collar and means for holding the said lever in a central position, substantially as described.

6. In combination in a driving mechanism, a shaft and pulley with friction driving elements between them, a clutch associated with said friction elements and a detachable connection between the said friction elements and the pulley, with means for controlling the parts whereby when the pulley is detached from the friction elements, the clutch is thrown in to make the said friction elements act as a brake, substantially as described.

7. In combination the shaft, a friction member fixed on the shaft, a casing, a friction-plate, said casing and plate inclosing the fixed friction member, an adjustable resilient connection between the plate and casing and means for controlling the plate and casing, substantially as described.

In testimony whereof we affix our signatures in presence of two witnesses.

FRANK B. WILDMAN.
EVARTS G. LOOMIS.

Witnesses:
CARRIE LANDIS,
AVONIA FRICK.